(12) United States Patent
Miranda et al.

(10) Patent No.: US 9,870,788 B2
(45) Date of Patent: Jan. 16, 2018

(54) METHOD OF ADJUSTING TILT USING MAGNETIC ERASE WIDTH FEEDBACK

(71) Applicant: Western Digital (Fremont), LLC, Fremont, CA (US)

(72) Inventors: Leo Michael C. Miranda, Pathumthani (TH); Mark D. Moravec, Pathumthani (TH); Tang Hyok Lim, Penang (MY); Reymon G. Ilaw, Pathumtani (TH)

(73) Assignee: Western Digital (Fremont), LLC, Fremont, CA (US)

( * ) Notice: Subject to any disclaimer, the term of this patent is extended or adjusted under 35 U.S.C. 154(b) by 226 days.

(21) Appl. No.: 14/276,111

(22) Filed: May 13, 2014

(65) Prior Publication Data

US 2015/0194168 A1 Jul. 9, 2015

Related U.S. Application Data

(60) Provisional application No. 62/925,056, filed on Jan. 8, 2014.

(51) Int. Cl.
*G11B 5/31* (2006.01)
*B24B 37/04* (2012.01)
(Continued)

(52) U.S. Cl.
CPC .......... *G11B 5/3166* (2013.01); *B24B 37/048* (2013.01); *B24B 37/07* (2013.01); *G11B 5/3116* (2013.01); *G11B 5/3163* (2013.01); *G11B 5/3169* (2013.01); *G11B 5/3173* (2013.01); *G11B 5/3196* (2013.01); *G11B 5/455* (2013.01); *B24B 37/042* (2013.01);
(Continued)

(58) Field of Classification Search
CPC ... G11B 5/3116; G11B 5/3163; G11B 5/3166; G11B 5/3169; G11B 5/3173; G11B 5/3196; G11B 5/455; B24B 37/042; B24B 37/048; B24B 37/07; Y10T 29/49032; Y10T 29/49036; Y10T 29/49041; Y10T 29/49053
See application file for complete search history.

(56) References Cited

U.S. PATENT DOCUMENTS

| 6,075,673 A | 6/2000 | Wilde et al. |
| 6,097,575 A | 8/2000 | Trang et al. |

(Continued)

FOREIGN PATENT DOCUMENTS

| JP | 59054053 A | * 3/1984 |
| KR | 100699889 B1 | 3/2007 |

OTHER PUBLICATIONS

International Search Report and Written Opinion dated Jan. 8, 2015 from related PCT Serial No. PCT/US2015/010698, 11 pages.
(Continued)

*Primary Examiner* — A. Dexter Tugbang
(74) *Attorney, Agent, or Firm* — Foley & Lardner LLP

(57) ABSTRACT

A method is provided for manufacturing a magneto-resistive device, comprising the steps of: extracting at least one subset of bars from at least one bar section of a wafer; obtaining a magnetic performance of the at least one subset of the bars; determining an angle based on the magnetic performance; and processing remaining bars from the at least one bar section of the wafer based on the determined angle.

9 Claims, 6 Drawing Sheets

(51) Int. Cl.
*G11B 5/455* (2006.01)
*B24B 37/07* (2012.01)

(52) U.S. Cl.
CPC .... *Y10T 29/49032* (2015.01); *Y10T 29/49036* (2015.01); *Y10T 29/49041* (2015.01); *Y10T 29/49053* (2015.01)

(56) References Cited

U.S. PATENT DOCUMENTS

| | | |
|---|---|---|
| 6,125,014 A | 9/2000 | Riedlin, Jr. |
| 6,125,015 A | 9/2000 | Carlson et al. |
| 6,130,863 A | 10/2000 | Wang et al. |
| 6,137,656 A | 10/2000 | Levi et al. |
| 6,144,528 A | 11/2000 | Anaya-Dufresne et al. |
| 6,147,838 A | 11/2000 | Chang et al. |
| 6,151,196 A | 11/2000 | Carlson et al. |
| 6,178,064 B1 | 1/2001 | Chang et al. |
| 6,181,522 B1 | 1/2001 | Carlson |
| 6,181,673 B1 | 1/2001 | Wilde et al. |
| 6,229,672 B1 | 5/2001 | Lee et al. |
| 6,236,543 B1 | 5/2001 | Han et al. |
| 6,246,547 B1 | 6/2001 | Bozorgi et al. |
| 6,249,404 B1 | 6/2001 | Doundakov et al. |
| 6,330,131 B1 | 12/2001 | Nepela et al. |
| 6,339,518 B1 | 1/2002 | Chang et al. |
| 6,349,017 B1 | 2/2002 | Schott |
| 6,373,660 B1 | 4/2002 | Lam et al. |
| 6,378,195 B1 | 4/2002 | Carlson |
| 6,522,504 B1 | 2/2003 | Casey |
| 6,538,850 B1 | 3/2003 | Hadian et al. |
| 6,583,953 B1 | 6/2003 | Han et al. |
| 6,646,832 B2 | 11/2003 | Anaya-Dufresne et al. |
| 6,661,612 B1 | 12/2003 | Peng |
| 6,665,146 B2 | 12/2003 | Hawwa et al. |
| 6,690,545 B1 | 2/2004 | Chang et al. |
| 6,704,173 B1 | 3/2004 | Lam et al. |
| 6,708,389 B1 | 3/2004 | Carlson et al. |
| 6,717,773 B2 | 4/2004 | Hawwa et al. |
| 6,721,142 B1 | 4/2004 | Meyer et al. |
| 6,744,599 B1 | 6/2004 | Peng et al. |
| 6,771,468 B1 | 8/2004 | Levi et al. |
| 6,796,018 B1 | 9/2004 | Thornton |
| 6,801,402 B1 | 10/2004 | Subrahmanyam et al. |
| 6,856,489 B2 | 2/2005 | Hawwa et al. |
| 6,873,496 B1 | 3/2005 | Sun et al. |
| 6,884,148 B1 * | 4/2005 | Dovek .................. B24B 37/042 451/5 |
| 6,912,103 B1 | 6/2005 | Peng et al. |
| 6,937,439 B1 | 8/2005 | Chang et al. |
| 6,956,718 B1 | 10/2005 | Kulkarni et al. |
| 6,972,930 B1 | 12/2005 | Tang et al. |
| 7,006,330 B1 | 2/2006 | Subrahmanyam et al. |
| 7,006,331 B1 | 2/2006 | Subrahmanyam et al. |
| 7,010,847 B1 | 3/2006 | Hadian et al. |
| 7,019,945 B1 | 3/2006 | Peng et al. |
| 7,027,264 B1 | 4/2006 | Subrahmanyam et al. |
| 7,085,104 B1 | 8/2006 | Hadian et al. |
| 7,099,117 B1 | 8/2006 | Subrahmanyam et al. |
| 7,174,622 B2 | 2/2007 | Meyer et al. |
| 7,289,299 B1 | 10/2007 | Sun et al. |
| 7,307,816 B1 | 12/2007 | Thornton et al. |
| 7,315,435 B1 | 1/2008 | Pan |
| 7,315,436 B1 | 1/2008 | Sanchez |
| 7,414,814 B1 | 8/2008 | Pan |
| 7,436,631 B1 | 10/2008 | Fanslau, Jr. et al. |
| 7,474,508 B1 | 1/2009 | Li et al. |
| 7,477,486 B1 | 1/2009 | Sun et al. |
| 7,593,190 B1 | 9/2009 | Thornton et al. |
| 7,595,963 B1 | 9/2009 | Chen et al. |
| 7,616,405 B2 | 11/2009 | Hu et al. |
| 7,729,089 B1 | 6/2010 | Hogan |
| 7,982,989 B1 | 7/2011 | Shi et al. |
| 7,995,310 B1 | 8/2011 | Pan |
| 8,081,400 B1 | 12/2011 | Hu |
| 8,087,973 B1 | 1/2012 | Sladek et al. |
| 8,089,730 B1 | 1/2012 | Pan et al. |
| 8,151,441 B1 | 4/2012 | Rudy et al. |
| 8,164,858 B1 | 4/2012 | Moravec et al. |
| 8,165,709 B1 | 4/2012 | Rudy |
| 8,199,437 B1 | 6/2012 | Sun et al. |
| 8,208,224 B1 | 6/2012 | Teo et al. |
| 8,218,268 B1 | 7/2012 | Pan |
| 8,240,545 B1 | 8/2012 | Wang et al. |
| 8,256,272 B1 | 9/2012 | Roajanasiri et al. |
| 8,295,012 B1 | 10/2012 | Tian et al. |
| 8,295,013 B1 | 10/2012 | Pan et al. |
| 8,295,014 B1 | 10/2012 | Teo et al. |
| 8,320,084 B1 | 11/2012 | Shum et al. |
| 8,325,446 B1 | 12/2012 | Liu et al. |
| 8,325,447 B1 | 12/2012 | Pan |
| 8,339,742 B1 | 12/2012 | Sladek et al. |
| 8,339,747 B1 | 12/2012 | Hales et al. |
| 8,339,748 B2 | 12/2012 | Shum et al. |
| 8,343,363 B1 | 1/2013 | Pakpum et al. |
| 8,345,519 B1 | 1/2013 | Pan |
| 8,418,353 B1 | 4/2013 | Moravec et al. |
| 8,441,896 B2 | 5/2013 | Wang et al. |
| 8,446,694 B1 | 5/2013 | Tian et al. |
| 8,456,643 B2 | 6/2013 | Prabhakaran et al. |
| 8,456,776 B1 | 6/2013 | Pan |
| 8,462,462 B1 | 6/2013 | Moravec et al. |
| 8,477,459 B1 | 7/2013 | Pan |
| 8,485,579 B2 | 7/2013 | Roajanasiri et al. |
| 8,488,279 B1 | 7/2013 | Pan et al. |
| 8,488,281 B1 | 7/2013 | Pan |
| 8,490,211 B1 | 7/2013 | Leary |
| 8,514,522 B1 | 8/2013 | Pan et al. |
| 8,533,936 B1 | 9/2013 | Puttichaem et al. |
| 8,545,164 B2 | 10/2013 | Choumwong et al. |
| 8,553,365 B1 | 10/2013 | Shapiro et al. |
| 8,587,901 B1 | 11/2013 | Puttichaem et al. |
| 8,593,764 B1 | 11/2013 | Tian et al. |
| 8,599,653 B1 | 12/2013 | Mallary et al. |
| 8,605,389 B1 | 12/2013 | Pan et al. |
| 8,611,050 B1 | 12/2013 | Moravec et al. |
| 8,611,052 B1 | 12/2013 | Pan et al. |
| 8,623,197 B1 | 1/2014 | Kobsiriphat et al. |
| 8,624,184 B1 | 1/2014 | Souza et al. |
| 8,665,566 B1 | 3/2014 | Pan et al. |
| 8,665,567 B2 | 3/2014 | Shum et al. |
| 8,665,677 B1 | 3/2014 | Panitchakan et al. |
| 8,665,690 B1 | 3/2014 | Moravec et al. |
| 8,693,144 B1 | 4/2014 | Pan et al. |
| 8,756,795 B1 | 6/2014 | Moravec et al. |
| 8,758,083 B1 | 6/2014 | Rudy et al. |
| 8,760,812 B1 | 6/2014 | Chen et al. |
| 8,770,463 B1 | 7/2014 | Puttichaem et al. |
| 8,773,664 B1 | 7/2014 | Wang et al. |
| 8,792,212 B1 | 7/2014 | Pan et al. |
| 8,792,213 B1 | 7/2014 | Vijay et al. |
| 8,797,691 B1 | 8/2014 | Tian et al. |
| 2007/0155028 A1 | 7/2007 | Jang et al. |
| 2008/0022510 A1 | 1/2008 | Tanaka |
| 2008/0127481 A1 | 6/2008 | Lee et al. |
| 2009/0313811 A1 | 12/2009 | Takahashi et al. |
| 2011/0051293 A1 * | 3/2011 | Bai ....................... G11B 5/3116 360/313 |
| 2011/0085266 A1 | 4/2011 | Kanai et al. |
| 2013/0244541 A1 | 9/2013 | Yaemglin et al. |
| 2013/0293982 A1 | 11/2013 | Huber |

OTHER PUBLICATIONS

International Search Report and Written Opinion dated Apr. 28, 2015 from related PCT Serial No. PCT/US2015/010698, 11 pages.
Written Opinion issued on Singapore Application 11201605573U, dated Jun. 13, 2017.

* cited by examiner

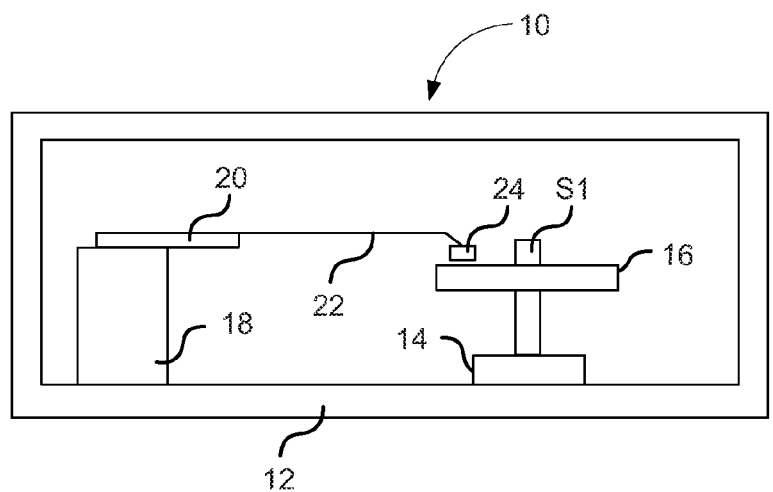
Figure 1A
(Conventional)
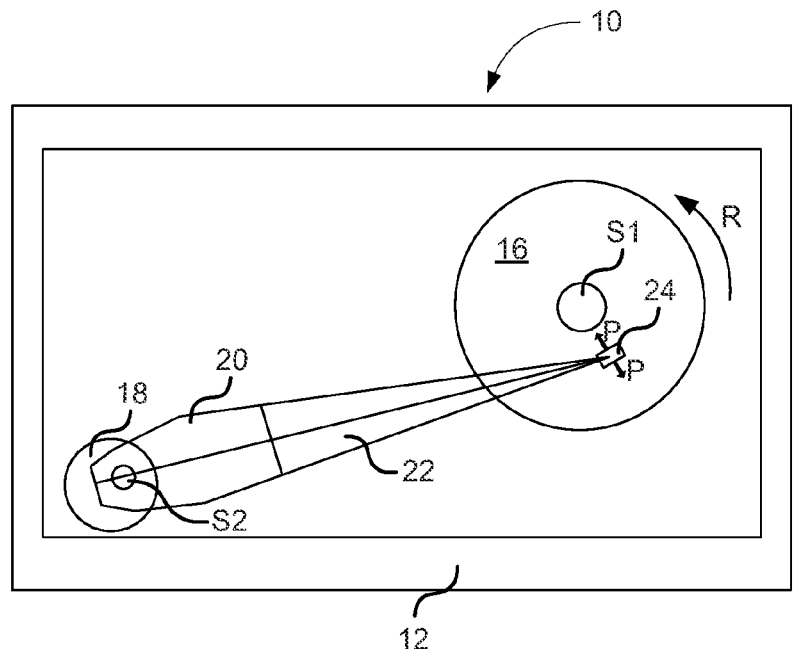
Figure 1B
(Conventional)

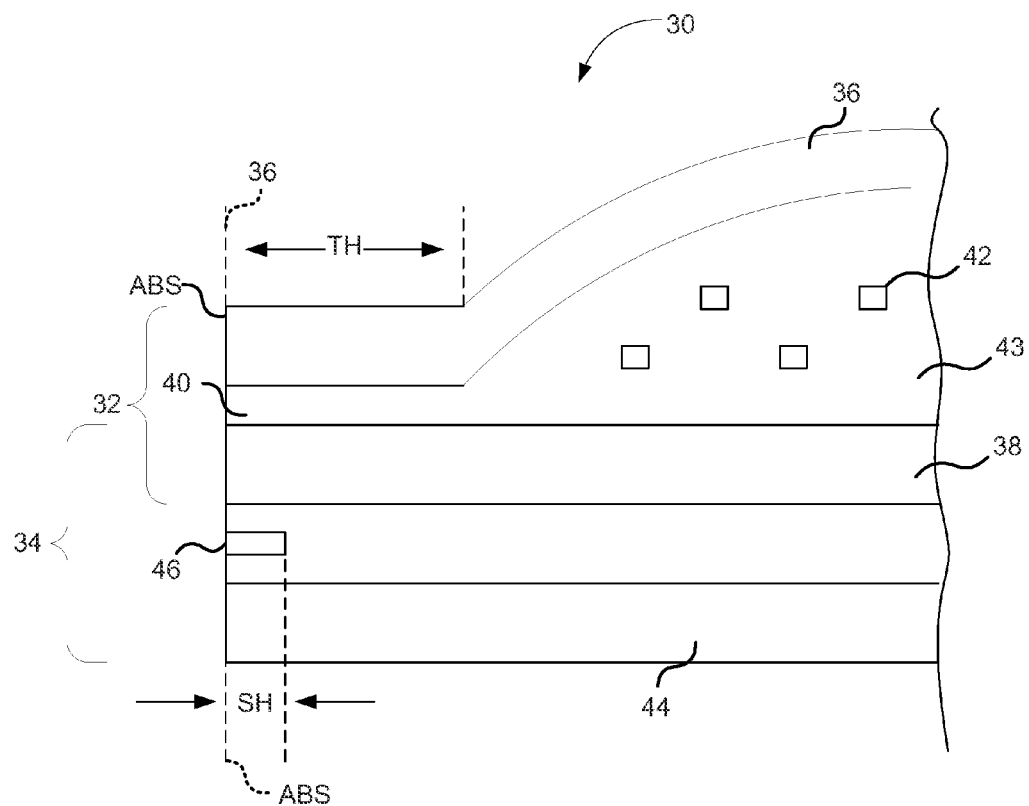
Figure 1C
(Conventional)

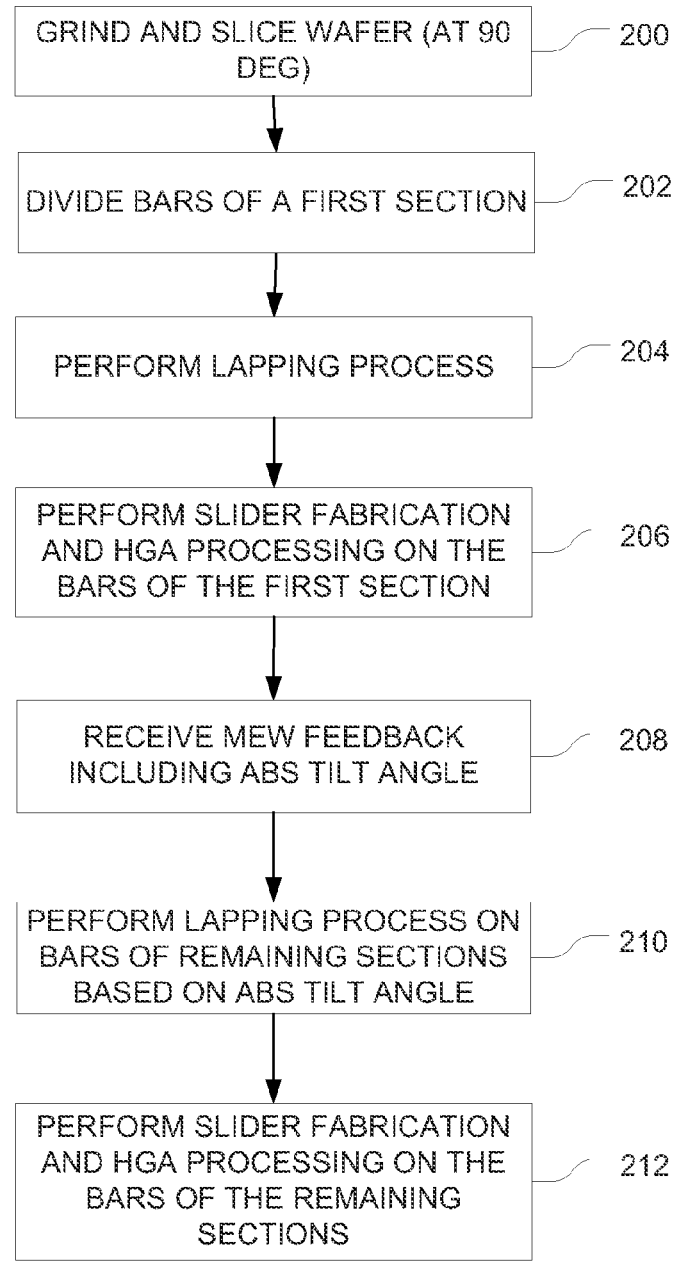
Figure 2
(Conventional)

METHOD OF ADJUSTING TILT USING MAGNETIC ERASE WIDTH FEEDBACK

CROSS-REFERENCE TO RELATED APPLICATIONS

This application claims the benefit of U.S. Provisional Application Ser. No. 61/925,056, filed Jan. 8, 2014, which is incorporated herein by reference in its entirety.

BACKGROUND

Magnetic storage devices such as hard disk drives use magnetic media to store data and a movable slider having magnetic transducers (e.g., read/write heads) positioned over the magnetic media to selectively read data from and write data to the magnetic media. Electronic lapping guides (ELGs) are used for precisely controlling a degree of lapping applied to an air bearing surface (ABS) of the sliders for achieving a particular stripe height, or distance from the ABS, for the magnetic transducers located on the sliders. U.S. Pat. No. 8,165,709 to Rudy and U.S. Pat. No. 8,151,441 to Rudy et al., which are incorporated herein by reference in their entirety, provide a comprehensive description of ELGs used in manufacturing sliders for hard disk drives.

As the design of magnetic transducers becomes more and more intricate, their fabrication processes become increasingly complex as well. Such complex fabrication processes inherently include some imperfections that ultimately manifest as undesirable variations in the final product. By observing certain performance parameters of the final product (e.g., sliders including one or more magnetic transducers), these undesirable variations can be measured and quantified. A system and method for reducing or eliminating these undesirable variations in the performance of magnetic transducers is therefore needed.

BRIEF DESCRIPTION OF THE DRAWINGS

The present invention is illustrated by way of example, and not limitation, in the figures of the accompanying drawings in which:

FIGS. 1A and 1B illustrate an example of a conventional magnetic disk drive in which a magnetic read element manufactured in accordance with various embodiments may be utilized;

FIG. 1C illustrates an example of a conventional read/write head.

FIG. 2 is an operational flow chart illustrating a conventional process for manufacturing a magnetic read element;

DETAILED DESCRIPTION

Figure 3:
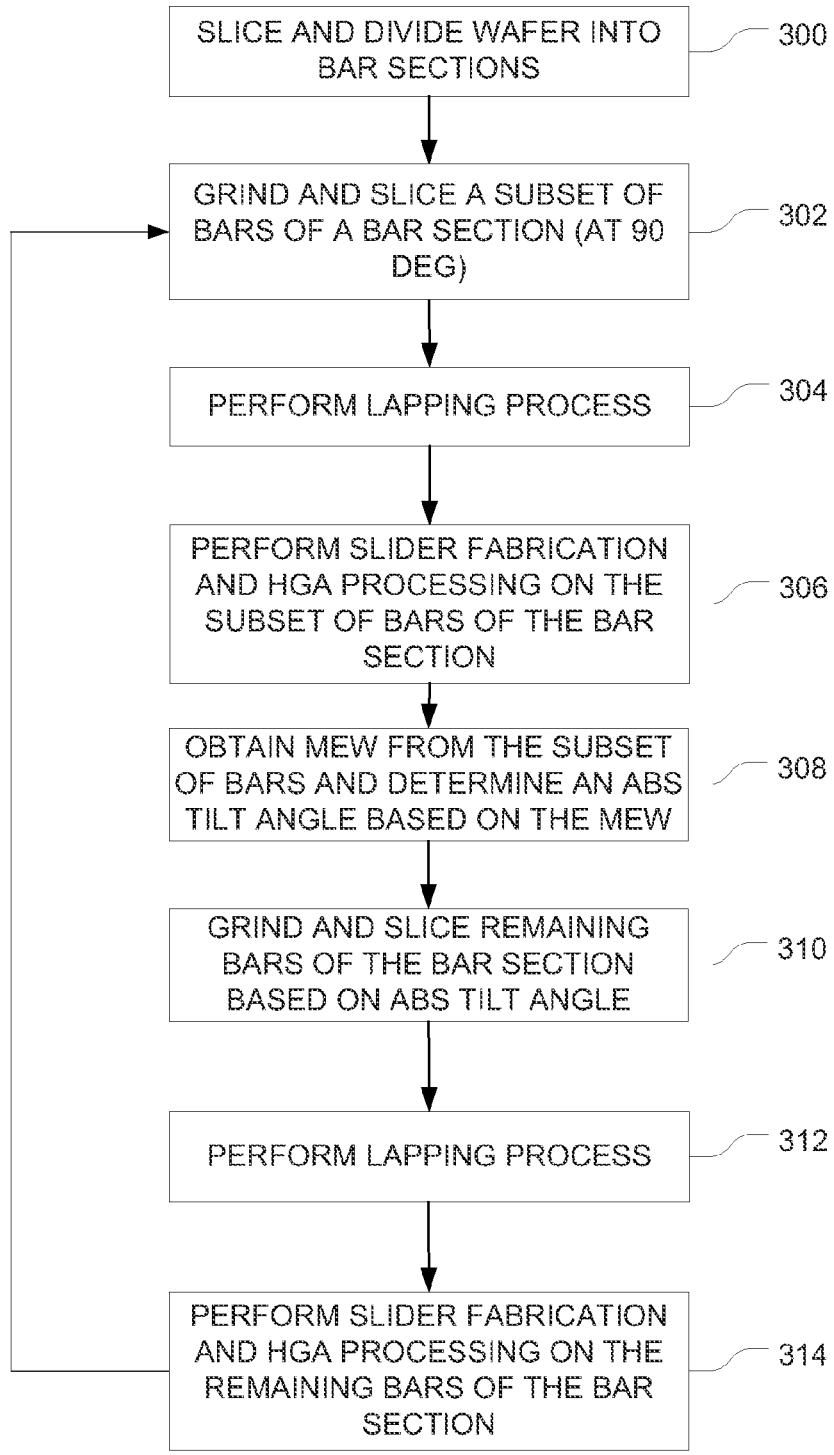
FIG. 3 is an operational flow chart illustrating a process for manufacturing a magnetic read element in accordance with various embodiments.

As described above, magnetic storage devices such as hard disk drives use magnetic media to store data and a movable slider having magnetic transducers positioned over the magnetic media to selectively read data from and write data to the magnetic media. The movable slider and magnetic transducers may be a sub-component of a head gimbal assembly (HGA). The magnetic transducer typically comprises a magneto-resistive read element (e.g., a so-called giant magneto-resistive read element, or a tunneling magneto-resistive read element) and an inductive write structure comprising a flat coil deposited by photolithography and a yoke structure having pole tips that face a disk media.

FIGS. 1A and 1B illustrate an example magnetic disk drive 10 that can include a sealed enclosure 12, a disk drive motor 14, a magnetic disk 16, supported for rotation by a spindle S1 of motor 14, an actuator 18 and an arm 20 attached to a spindle S2 of actuator 18. Suspension 22 is coupled at one end to arm 20, and at its other end to a read/write head or transducer 24. Transducer 24 typically includes an inductive write element with a magneto-resistive read element (shown in FIG. 1C). As motor 14 rotates magnetic disk 16, as indicated by the arrow R, an air bearing is formed under transducer 24 causing it to lift slightly off of the surface of magnetic disk 16, or, as it is termed in the art, to "fly" above magnetic disk 16. Various magnetic "tracks" of information can be read from magnetic disk 16 as actuator 18 causes transducer 24 to pivot in a short arc as indicated by arrows P.

FIG. 1C illustrates a magnetic read/write head 30 including a write element 32 and read element 34. The edges of write element 32 and read element 34 also define an ABS in a plane 33, which flies above the surface of the magnetic disk 16 during operation.

Read element 34 includes a first shield 44, an intermediate layer 38 which serves as a second shield, and a read sensor 46 located between the first shield 44 and the intermediate layer 38. Read sensor 46 has a particular stripe height and a particular location between the first shield 44 and the second shield 38, both of which are chosen to attain particular read performance. Control of stripe height is important in controlling device resistance, device output amplitude, device bias point and consequently many related measures of performance. Magneto-resistive sensors can be used with a variety of stripe heights, with a typical stripe height being smaller than about 2 microns, including much less than 1 micron. Further, although read sensor 46 is shown in FIG. 1C as a shielded single-element vertical read sensor, read element 34 can take a variety of forms as is known to those skilled in the art, such as unshielded read sensors.

Write element 32 is typically an inductive write element including the intermediate layer 38 which serves as a first yoke element or pole, and a second yoke element or pole 36, defining a write gap 40 therebetween. First yoke element 38 and second yoke element 36 are configured and arranged relative to each other such that the write gap 40 has a particular nose length, NL. Also included in write element 32, is a conductive coil 42 that is positioned within a dielectric medium 43. As is well known to those skilled in the art, these elements operate to magnetically write data on a magnetic medium such as a magnetic disk 16.

Magneto-resistive devices utilized in the aforementioned magneto-resistive read elements can be manufactured by depositing a plurality of rows of magnetic transducers on a wafer (substrate). The wafer may then be diced/cut into bars of active device regions for incorporation into a magnetic recording head. Subsequent to the dicing/cutting process, the resulting bars are subjected to a lapping process to reduce the stripe heights of the magneto-resistive devices to a desired height, and to smooth or polish the surface of the structure.

Stripe height can determine the sensitivity of the magneto-resistive device to a magnetic field, where a reduction in stripe height may produce a more sensitive magnetoresistive device, As magnetic recording density increases, scaled down magneto-resistive devices, e.g., giant magneto-resistive devices, are used to achieve adequate signal output, and as magneto-resistive devices scale down, stripe height scales down accordingly.

FIG. 2 illustrates an example conventional process for manufacturing a magnetic read element. At operation 200, a wafer is ground and sliced. During operation 200, the bars are cut at a 90 degree angle. At operation 202, the bars of a first section are divided. At operation 204, a lapping process is performed to obtain an angle for improving the magnetic performance of the resulting magnetic heads. At operation 206, slider fabrication and HGA processing is performed on the bars of the first section. At operation 208, magnetic erase width (MEW) feedback is received, where the MEW feedback includes/corresponds to a desired ABS tilt angle that should be applied to the bars. MEW can refer a measurement which involves the direct measurement of magnetic erasure. That is, MEW may be a measure of recording field bubble footprint width, and therefore, a good indicator of the magnetic transducer performance. At operation 210, another lapping process is performed on bars of the remaining sections (of the wafer) based on the desired ABS tilt angle. At operation 212, slider fabrication and HGA processing is performed on the bars of the remaining sections.

Using the conventional manufacturing process of FIG. 2, it can be appreciated that the desired ABS tilt angle is applied during subsequent lapping processes. However, the amount of tilt that can be applied is limited to approximately −0.15 deg to +0.20 deg. This cannot account for sections of the wafer (in some cases, up to approximately 15% of the wafer) that may require upwards of, e.g., +/−0.4 deg of tilt to achieve optimum optical performance.

Accordingly, systems and methods are provided for reducing or eliminating undesirable variations in the performance of magnetic transducers. In particular, systems and methods adjust ABS tilt using MEW feedback from processing a sample/subset of row bars from at least one bar section of a wafer.

FIG. 3 illustrates an example process for manufacturing a magnetic read element in accordance with various embodiments. At operation 300, a wafer is sliced and divided into bar sections. At operation 302, a subset of bars of a bar section (of the plurality of bar sections) are ground and sliced. It should be noted that this grinding and slicing process is performed at a 90 deg angle. In accordance with one embodiment, the subset of bars that are ground and sliced comprise 3 bars, a "top" bar, a "middle" bar, and a "bottom" bar of the bar section. At operation 304, slider fabrication and HGA processing is performed on the subset of bars of the bar section. At operation 308, MEW is obtained from the subset of bars (based on the performance of the slider fabrication and HGA processing), and an ABS angle tilt is determined based on the MEW. In other words, MEW feedback is received, where the MEW feedback includes/corresponds to a desired ABS tilt angle that should be applied to the bars. At operation 310, the remaining bars of the bar section are ground and sliced based on the ABS tilt angle. At operation 312, another lapping process is performed on the remaining bars, and at operation 314, slider fabrication and HGA processing is performed on the remaining bars. Subjecting the remaining bars of the bar section to this subsequent lapping process allows for fine-tuning of ABS perpendicularity. Subsequent to operation 314, the method of FIG. 3 may repeat, where another subset of bars of another bar section is ground and sliced per operation 302. Operations 304-314 may also be repeated until the bars of all the remaining bar sections have been processed.

It can be appreciated that processing the subset of bars of a particular bar section of the wafer allows for improved optimization with regard to applying an ABS tilt angle for optimum magnetic performance. That is, instead of applying the same ABS tilt angle to all the bar sections of wafer (as would be the case with the conventional manufacturing process of FIG. 2), MEW feedback can be received to account for the nuances/variations of the wafer at different sections, such that an appropriate ABS tilt angle can be applied (up to, for example, +/−0.5 deg) if needed at the slicing and grinding stage and fine-tuned with a lapping process. Accordingly, manufacturing a slider in accordance with various embodiments is no longer limited to ABS tilt angle adjustment of merely −0.15 deg to +0.20 deg that is achieved with lapping alone.

In accordance with another embodiment, the grinding and slicing of multiple subsets of bars from multiple bar sections can be performed rather than undergoing the aforementioned repetitive process to capture MEW feedback from multiple bar sections. Hence, the variations of a wafer may still be accounted for to optimize ABS tilt angle.

Figure 4:
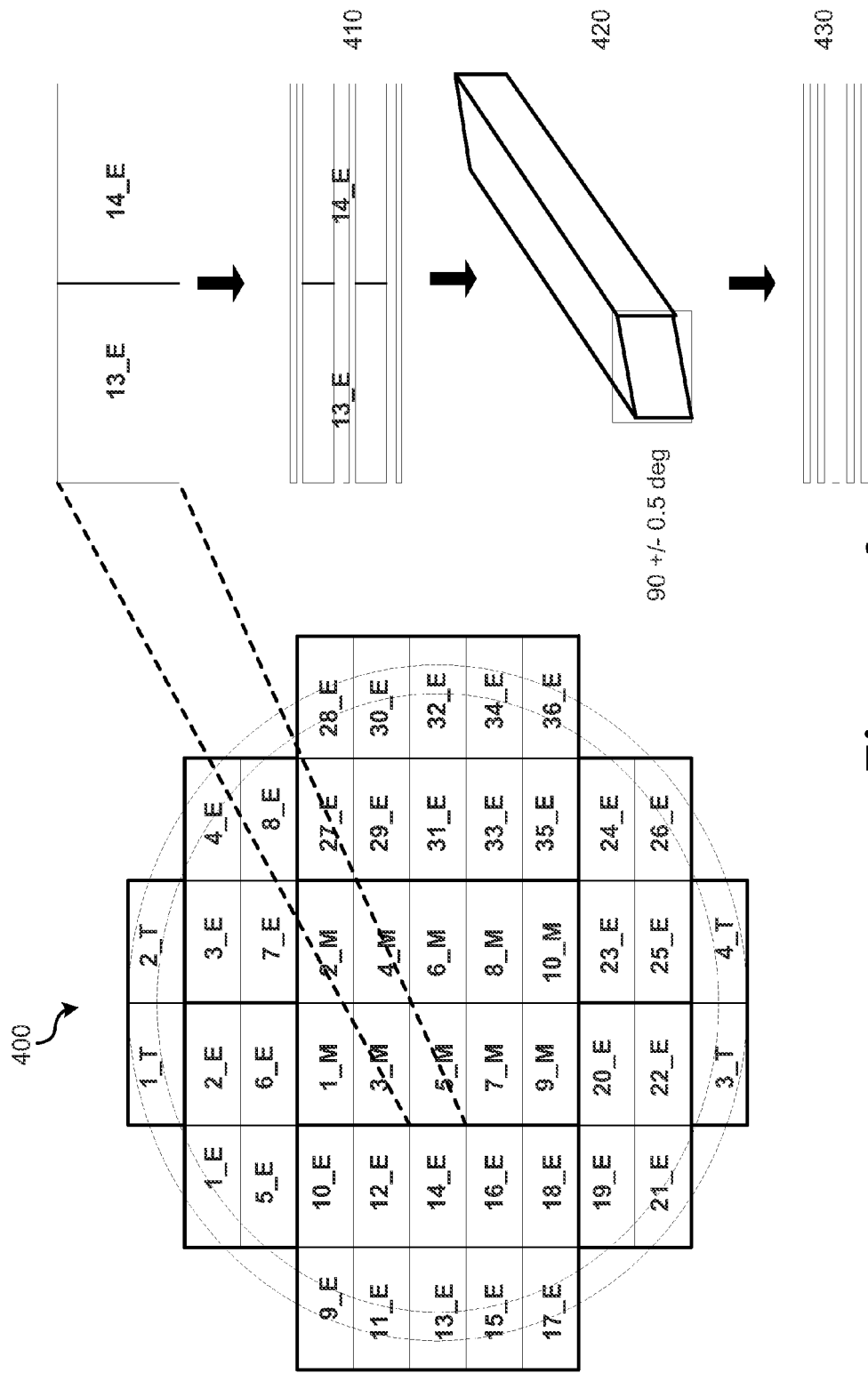
FIG. 4 illustrates a sequence of views during an example method of processing a wafer in accordance with various embodiments.

FIG. 4 illustrates a sequence of views during a method of processing an example wafer 400, where wafer 400 can be sliced and divided into a plurality of bar sections in accordance with various embodiments. A bar section, as described herein, may include "top" and "bottom" bar sections, "edge" bar sections, and "middle" bar sections. For example the top bar section may include a bar section comprising areas 1_T and 2_T, while the bottom bar section may include a bar section comprising areas 3_T and 4_T. The edge bar sections may include bar sections comprising the following areas: 1_E and 2_E; 3_E and 4_E; 5_E and 6_E; 7_E and 8_E; 9_E and 10_E; 11_E and 12_E; 13_E and 14_E; 15_E and 16_E; 17_E and 18_E; 19_E and 20_E; 21_E and 22_E; 23_E and 24_E; 25_E and 26_E; 27_E and 28_E; 29_E and 30_E; 31_E and 32_E; 33_E and 34_E; and 35_E and 36_E. The middle bar sections may include bar sections comprising the following areas: 1_M and 2_M; 3_M and 4_M; 5_M and 6_M; 7_M and 8_M; and 9_M and 10_M. In this example, a wafer may have 25 bar sections, and each bar section can be indicative of a finger print. Different bar sections may have different fingerprint/overlay characteristics.

As can be appreciated, top, bottom, and edge bar sections may have areas that have an "abnormal" MEW profile, whereas middle bar sections may be considered to be relatively flat, or at least have a "constant" MEW profile. That is, a single/constant ABS tilt angle may applied to any of the bars of the middle bar sections to achieve optimum magnetic performance. However, those sections having the abnormal MEW profile may require different ABS tilt angles to be applied. For example, the top and bottom bar sections may have an abnormal MEW profile across both areas of the respective bars. The edge bar sections may have either a left or right area (that coincides with an edge of the wafer) that may have an abnormal MEW profile.

In particular, considering one edge bar section that includes areas 13_E and 14_E, area 13_E may coincide with an edge of wafer 400 that can result in area 13_E having an abnormal MEW profile. Accordingly, to achieve optimum magnetic performance, it would not be desirable to apply the ABS tilt angle that would be applicable to a middle bar section including areas 1_M and 2_M to the edge bar section including areas 13_E and 14_E. Rather, and in accordance with various embodiments, MEW feedback may be received relative to a subset of bars of one or more bar sections of a wafer to arrive at a preferred or desirable ABS tilt angle for the one or more bar sections of the wafer.

In the example illustrated in FIG. 4, operation 410 may involve extracting at least one subset of bars from at least one bar section of wafer 400. The at least one subset of bars may include bars ground and sliced from the top, middle, and bottom of a bar section (in this example, the top, middle, and bottom bars from the bar section including areas 13_E and 14_E). The at least one subset of bars are extracted in order to obtain a magnetic performance of the at least one subset of bars and determine an angle based on the magnetic performance at operation 420. That is, a representative sampling of the MEW profile may be obtained for multiple bar sections (rather than a single MEW profile from a single bar section that is applied to an entire wafer). It should be noted that in accordance with other embodiments, the at least one subset of bars may be bars obtained from other portions of a bar section, and can include more or less bars of the bar section. Based on the MEW feedback associated with the bars, the remaining bars of the at least one bar section may be processed at operation 430 based on the determined angle. In various embodiments, subsequent to extracting at least one subset of bars from at least one bar section, the remainder of the wafer may be stored for a period of time (e.g., 7-10 days).

Various embodiments can provide improved MEW average and sigma difference by eliminating tilt limitations at the lapping process in convention systems and methods. Additionally, HGA-level pitch static attitude (PSA) can be achieved as well as consistent rough lapping times. It should be noted that the ABS tilt angle accuracy and targeting may be further improved by utilizing a wedge detector.

In various embodiments, the processes described herein can be executed on one or more computers having a processor, memory, and other such components that are well known in the art for, e.g., controlling or directing the slicing and dividing of a wafer, selection of a bar section as well as selection of a subset of bars of the bar section, lapping, and other fabrication and processing, receiving MEW feedback, and applying information gleaned from such feedback in further fabrication and/or processing. In one embodiment, the processes can perform the sequence of actions in a different order. In another embodiment, the processes can skip one or more of the actions. In other embodiments, one or more of the actions are performed simultaneously. In some embodiments, additional actions can be performed.

Figure 5:
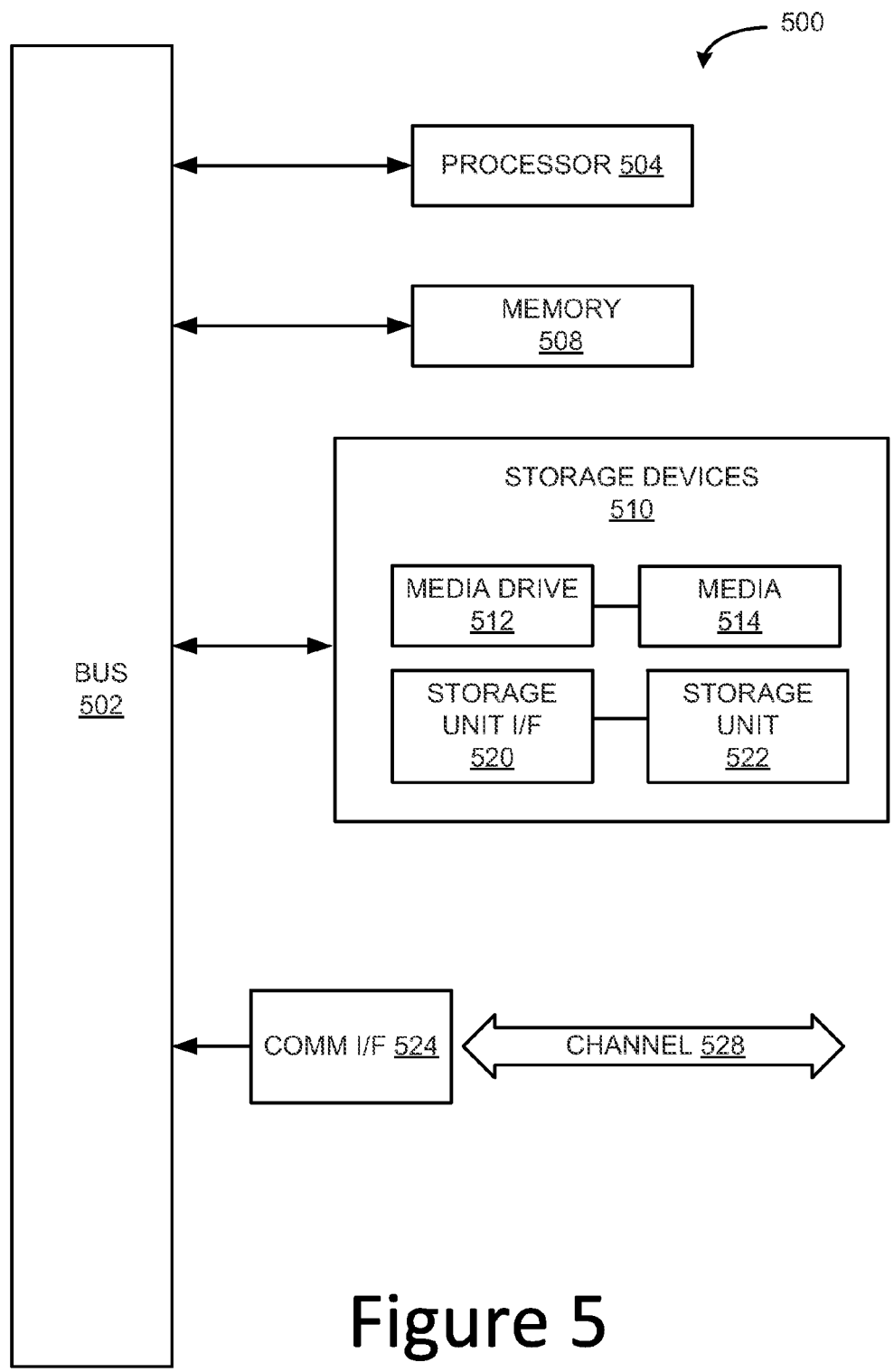
FIG. 5 illustrates an example computing module that may be used to implement various features of various embodiments.

FIG. 5 illustrates an example computing module that may be used to implement various features of the system and methods disclosed herein.

As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module capable of carrying out the functionality described with respect thereto. One such example computing module is shown in FIG. 5. Various embodiments are described in terms of this example-computing module 500. After reading this description, it will become apparent to a person skilled in the relevant art how to implement the application using other computing modules or architectures.

Referring now to FIG. 5, computing module 500 may represent, for example, computing or processing capabilities found within desktop, laptop, notebook, and tablet computers; hand-held computing devices (tablets, PDA's, smart phones, cell phones, palmtops, etc.); mainframes, supercomputers, workstations or servers; or any other type of special-purpose or general-purpose computing devices as may be desirable or appropriate for a given application or environment. Computing module 500 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 500 might include, for example, one or more processors, controllers, control modules, or other processing devices, such as a processor 504. Processor 504 might be implemented using a general-purpose or special-purpose processing engine such as, for example, a microprocessor, controller, or other control logic. In the illustrated example, processor 504 is connected to a bus 502, although any communication medium can be used to facilitate interaction with other components of computing module 500 or to communicate externally.

Computing module 500 might also include one or more memory modules, simply referred to herein as main memory 508. For example, preferably random access memory (RAM) or other dynamic memory might be used for storing information and instructions to be executed by processor 504. Main memory 508 might also be used for storing temporary variables or other intermediate information during execution of instructions to be executed by processor 504. Computing module 500 might likewise include a read only memory ("ROM") or other static storage device coupled to bus 502 for storing static information and instructions for processor 504.

The computing module 500 might also include one or more various forms of information storage mechanism 510, which might include, for example, a media drive 512 and a storage unit interface 520. The media drive 512 might include a drive or other mechanism to support fixed or removable storage media 514. For example, a hard disk drive, a floppy disk drive, a magnetic tape drive, an optical disk drive, a CD or DVD drive (R or RW), or other removable or fixed media drive might be provided. Accordingly, storage media 514 might include, for example, a hard disk, a floppy disk, magnetic tape, cartridge, optical disk, a CD or DVD, or other fixed or removable medium that is read by, written to or accessed by media drive 512. As these examples illustrate, the storage media 514 can include a computer usable storage medium having stored therein computer software or data.

In alternative embodiments, information storage mechanism 510 might include other similar instrumentalities for allowing computer programs or other instructions or data to be loaded into computing module 500. Such instrumentalities might include, for example, a fixed or removable storage unit 522 and an interface 520. Examples of such storage units 522 and interfaces 520 can include a program cartridge and cartridge interface, a removable memory (for example, a flash memory or other removable memory module) and memory slot, a PCMCIA slot and card, and other fixed or removable storage units 522 and interfaces 520 that allow software and data to be transferred from the storage unit 522 to computing module 500.

Computing module 500 might also include a communications interface 524. Communications interface 524 might be used to allow software and data to be transferred between computing module 500 and external devices. Examples of communications interface 524 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 524 might typically be carried on signals, which can be electronic, electromagnetic (which includes optical) or other signals capable of being exchanged by a given communications interface 524. These signals might be provided to communications interface 524 via a channel 528. This channel 528 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media such as, for example, memory 508, storage unit 520, media 514, and channel 528. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 500 to perform features or functions of the present application as discussed herein.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method of manufacturing a magneto-resistive device, comprising:
   extracting a first subset of bars and a second subset of bars from a first bar section of a wafer, the wafer including a plurality of bar sections stacked in a first direction, wherein each bar section extends in a second direction substantially perpendicular to the first direction, wherein each bar section of the plurality of bar sections includes a plurality of bars that are adjacent to one another, and wherein the first subset of bars includes at least two bars;
   obtaining a magnetic performance of the first subset of bars;
   determining, for the second subset of bars, an angle based on the magnetic performance, wherein the determined angle comprises an air bearing surface (ABS) tilt angle of the second subset of bars optimizing the magnetic performance of the magneto-resistive device; and
   processing the second subset of bars from the first bar section of the wafer based on the determined angle such that the ABS tilt angle of the second subset of bars is different than an ABS tilt angle of the first subset of bars.

2. The method of claim 1, wherein the first subset of bars extracted from the first bar section of the wafer comprises a top bar extracted from a top portion of the first bar section, a middle bar extracted from a middle portion of the first bar section, and a bottom bar extracted from a bottom portion of the first bar section.

3. The method of claim 1, wherein obtaining the magnetic performance comprises determining a magnetic erase width profile of the at least one subset of bars.

4. The method of claim 1, wherein the magneto-resistive device comprises a magnetic read head.

5. The method of claim 1, wherein the determined angle comprises a 90 degree angle having a variance up to +/−0.5 degrees.

6. The method of claim 1, further comprising grinding and slicing the first subset of bars, subjecting the first subset of bars to a first lapping process, and performing slider fabrication and head-gimbal assembly processing on the first subset of bars prior to obtaining the magnetic performance of the first subset of bars, wherein the processing of the second subset of bars comprises grinding and slicing the second subset of bars at the determined angle.

7. The method of claim 6, wherein the processing of the second subset of bars further comprises subjecting the second subset of bars to a second lapping process to fine-tune an ABS perpendicularity of the second subset of bars.

8. The method of claim 6, wherein the magneto-resistive device comprises a magnetic read head.

9. The method of claim 8, wherein the ABS tilt angle of the second subset of bars comprises a 90 degree angle having a variance up to +/−0.5 degrees.

* * * * *